Jan. 13, 1931.   J. W. CONNOLLY   1,788,985
PROTECTING DEVICE FOR CURING ALFALFA, GRAIN AND, THE LIKE
Filed Sept. 12, 1929
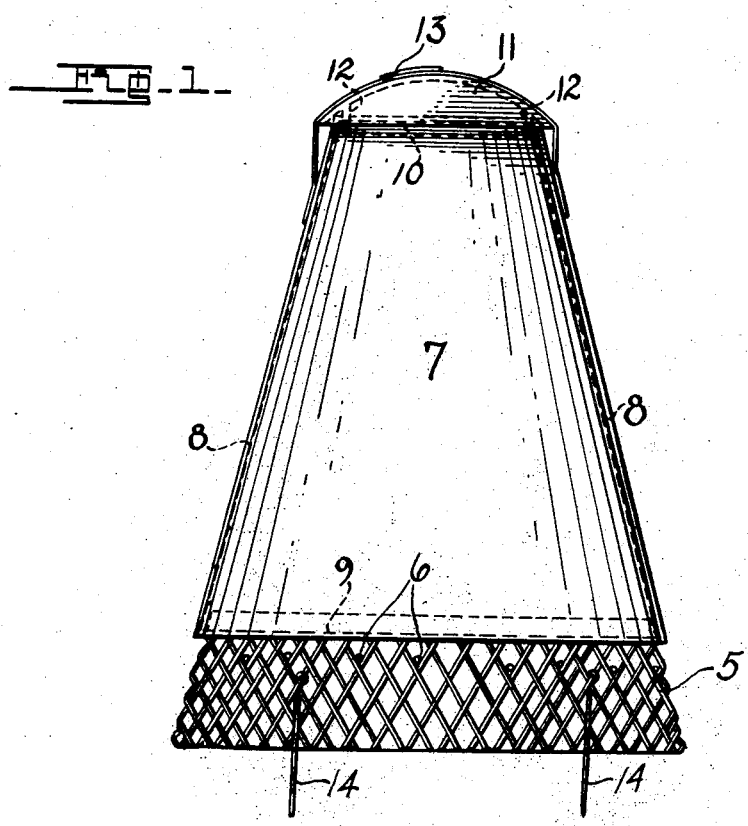
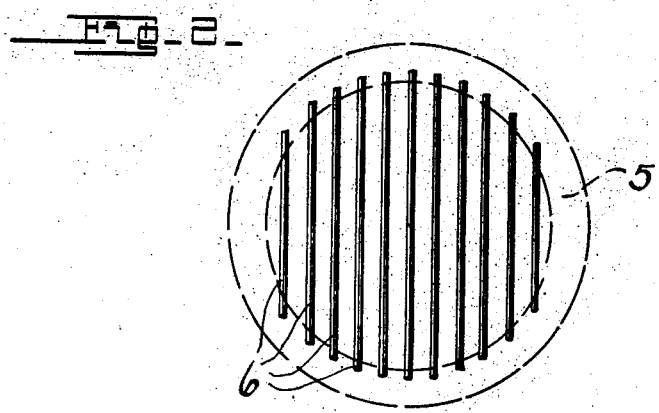
Inventor
James W. Connolly.
By D. Clyde Jones
Attorney Patented Jan. 13, 1931

1,788,985

UNITED STATES PATENT OFFICE

JAMES W. CONNOLLY, OF DUNDEE, NEW YORK

PROTECTING DEVICE FOR CURING ALFALFA, GRAIN, AND THE LIKE

Application filed September 12, 1929. Serial No. 392,185.

This invention relates to protecting devices for curing vegetable matter in the field.

It is the practice at the present time to cure hay, alfalfa, beans, grain and vegetable seed plants by stacking them in small piles on the ground. In a rainy season a large part of the crop may be lost because it is either completely decayed or its quality is so impaired that its value is greatly reduced. Even in ordinary seasons the portion of the plants that is stacked on the gound, tends to mold and frequently the outside surface of the pile that is exposed to the sun becomes bleached which renders it of less value. In the past, an attempt has been made to overcome this difficulty by placing a sheet of canvas over each pile of hay or the like resting on the ground and fastening the corners to the ground. This method has not been satisfactory because the hay or grain still rests on the ground and in the case of heavy rains the portion on the ground becomes wet and therefore deteriorates. In this method it is also necessary to remove the canvas to permit the hay or grain to cure or dry.

In accordance with the present invention a device for curing grain or the like has been designed to overcome the disadvantages outlined above. The main feature of the invention includes a device for accomplishing this result which supports the grain or the like above the ground and completely covers it with material that sheds water and yet permits it to dry or cure without removing any part of the device. A further feature of the invention relates to a device of this character which is inexpensive to manufacture and which is composed of separable elements which can be readily nested for transportation and storage.

For a clearer understanding of the invention reference is made to the drawings in which Fig. 1 is a side elevation of the protecting device of the present invention while Fig. 2 is a diagrammatic showing of a top view of the base alone with the supporting rods in place.

In Fig. 1 there is represented a base 5 made of wire mesh in the form of a truncated cone having a series of rods such as 6 passing through the mesh of the base and fastened thereto to form a ventilated support for the material which is to be cured in the protecting device. In order that the device may be held firmly in place against severe winds a series of pins 15 may be passed through the mesh to extend below the lower edge of the base 5 and be forced into the ground. A detachable cover 7, open at its top and bottom, is made of a metal framework comprising the inclined wires 8 connecting the top and bottom rings 9 and 10 the inclined sides of which framework are covered with a waterproof and verminproof material similar to burlap which will permit a certain amount of air to pass out through it and yet shed water. This portion of the protecting device is in the form of a truncated cone the lower part of which telescopes over a portion of the base 5. The open top of cover 7 is closed by disk 11 which may or may not have ears 12 engaging the interior of the cover. In order to hold the disk 11 in place a strap or other suitable means fastens it to the cover.

In using the devices a plurality of them are set up in the field each one of them arranged as shown in Fig. 1. The top 11 is removed and the device is filled with the alfalfa, hay, beans or other seed plant to be cured. The cover 11 is then fixed in place and the material protected in this way can safely remain in the field for an indefinite period until it is desired to remove it to a barn or warehouse. When it is desired to store the devices, the cover portion 7 is removed and other similar portions are nested together. The base 5 is similarly removed and other like pieces are nested together so that the device may be transported and stored in a minimum amount of space.

What I claim is:

1. In a device of the class described a ventilated base provided with a horizontal support, a cover engaging said base having a frame with inclined sides and covered with material which is substantially water-proof but which permits the passage of air there-through, and a water-proof top for said cover.

2. In a device of the class described a ventilated base provided with horizontal supports, said base being tapered so that it can be nested with other similar bases, a cover engaging said base comprising a frame having tapered sides covered with a water-proof material, and a removable top for said cover, said cover being disk-shaped so that it can nest with other similar parts.

3. In a device of the class described, a base made of wire mesh in the form of a truncated cone, horizontal rods attached to said wire mesh to form a support, a cover engaging said base but removable therefrom, said cover being made of a wire frame having inclined sides and covered with water-proof cloth, and a removable top for said cover.

In witness whereof, I hereunto subscribe my name this 11th day of September A. D. 1929.

JAMES W. CONNOLLY.